United States Patent [19]

Walker et al.

[11] Patent Number: 5,000,614
[45] Date of Patent: Mar. 19, 1991

[54] CONDUIT QUICK CONNECTOR ASSEMBLY HAVING A RAMPED HOUSING WITH A HAIR PIN RETAINER

[75] Inventors: Donald C. Walker, Pontiac; James McNaughton, Rochester, both of Mich.

[73] Assignee: Huron Products Corporation, Mt. Clemens, Mich.

[21] Appl. No.: 347,981

[22] Filed: May 5, 1989

[51] Int. Cl.⁵ .................. F16B 21/12; F16L 37/14
[52] U.S. Cl. ............................. 403/326; 403/379; 285/305
[58] Field of Search ............... 403/379, 378, 326; 285/305, 321

[56] References Cited

U.S. PATENT DOCUMENTS

| | | |
|---|---|---|
| 951,283 | 3/1910 | Krischer . |
| 2,021,241 | 11/1935 | Mall . |
| 2,535,016 | 12/1950 | Launder . |
| 2,772,898 | 12/1956 | Seeler . |
| 3,121,583 | 2/1964 | Damm . |
| 3,149,362 | 9/1964 | Smithson . |
| 3,154,327 | 10/1964 | Rothschild . |
| 3,215,455 | 11/1965 | Fiala et al. . |
| 3,268,260 | 8/1966 | Snipe . |
| 3,314,696 | 4/1967 | Ferguson et al. . |
| 3,342,273 | 9/1967 | Crane .............................. 403/379 X |
| 3,450,424 | 6/1969 | Calisher . |
| 3,471,186 | 10/1969 | Luebbert et al. . |
| 3,490,795 | 1/1970 | Hennlich . |
| 3,534,988 | 10/1970 | Lindsey . |
| 3,538,940 | 11/1970 | Graham . |
| 3,584,902 | 6/1971 | Vyse . |
| 3,625,551 | 12/1971 | Branton . |
| 3,637,240 | 1/1972 | Meier . |
| 3,698,747 | 10/1972 | Wing et al. . |
| 3,753,582 | 8/1973 | Graham . |
| 3,767,234 | 10/1973 | Weirich et al. . |
| 3,842,870 | 10/1974 | Burgess . |
| 3,973,791 | 8/1976 | Porta et al. . |
| 4,009,896 | 3/1977 | Brewer ............................... 285/305 |
| 4,218,979 | 8/1980 | Esposito et al. ............... 403/326 X |
| 4,234,262 | 11/1980 | Nakai et al. . |
| 4,260,184 | 4/1981 | Greenawalt et al. . |
| 4,344,516 | 8/1982 | Kolb .............................. 403/379 X |
| 4,367,968 | 1/1983 | Ishida ............................ 403/379 X |
| 4,423,891 | 1/1984 | Menges . |
| 4,431,218 | 2/1984 | Paul, Jr. et al. . |
| 4,505,058 | 3/1985 | Peterson ...................... 403/326 X |
| 4,524,995 | 6/1985 | Bartholomew . |
| 4,537,427 | 8/1985 | Cooke . |
| 4,570,980 | 2/1986 | Goward . |
| 4,640,534 | 2/1987 | Hoskins et al. ............... 285/305 X |
| 4,772,052 | 9/1988 | Morain . |

Primary Examiner—Peter M. Cuomo
Attorney, Agent, or Firm—Harness, Dickey & Pierce

[57] ABSTRACT

A quick connector assembly has a female housing with a hair pin style retaining clip to retain a beaded conduit therein. The female housing includes a pair of slots forming ramped surfaces on the housing to enable legs of the retainer to be transversely positioned within the axial bore of the female housing to retain male fittings therein.

7 Claims, 1 Drawing Sheet

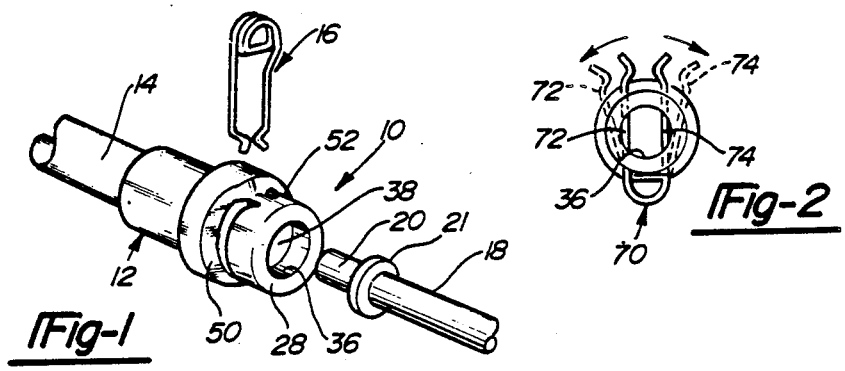
Fig-1
Fig-2
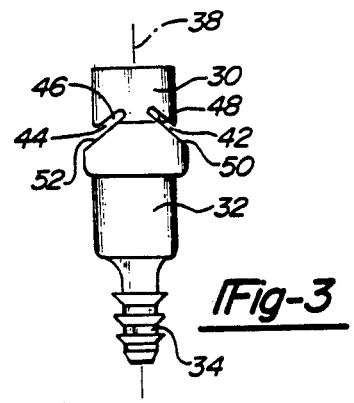
Fig-3
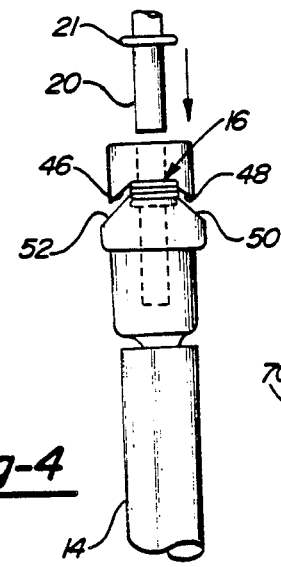
Fig-4
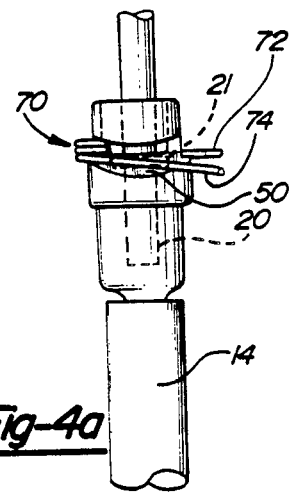
Fig-4a
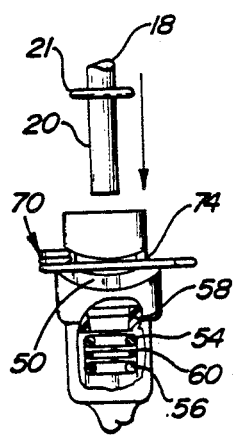
Fig-5
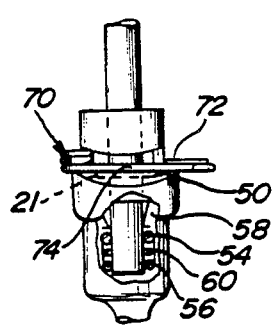
Fig-5a
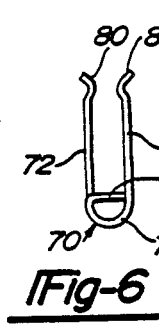
Fig-6
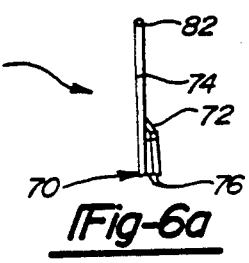
Fig-6a

CONDUIT QUICK CONNECTOR ASSEMBLY HAVING A RAMPED HOUSING WITH A HAIR PIN RETAINER

BACKGROUND AND SUMMARY OF THE INVENTION

The present invention relates to quick connector assemblies and, more particularly, to quick connector assemblies having female housings with ramped surfaces adapted to receive hair pin type retaining pins to retain male fittings within the housings.

In manufacturing fields, such as automotive, trucks, or the like, it is customary to employ quick disconnect devices to connect conduits or the like together. While conduits, such as piping, can be connected in a variety of ways, which include threaded couplings for efficient assembly of the mechanisms, it is desirable to have available a fluid coupling which can be attached very expeditiously but which at the same time, once attached, is substantially fail safe. Various types of couplings have been provided to be utilized in connecting of conduits.

These couplings are illustrated by the following U.S. patents. They are U.S. Pat. Nos. 951,283 issued to P. Krischer on Mar. 8, 1910; 2,021,241 issued to A. W. Mall on Nov. 19, 1935; 2,535,016 issued to J. M. Launder on Dec. 19, 1950; 2,772,898 issued to H. W. K. Sealer on Dec. 4, 1956; 3,121,583 issued to C. A. Damm on Feb. 8, 1984; 3,149,362 issued to C. B. Smithson on Sept. 22, 964; 3,154,327 issued to R. D. Rothschild on Oct. 27, 964; 3,215,455 issued to E. J. H. Fiala et al on Nov. 2, 1965; 3,268,260 issued to A. Snipe on Aug. 23, 1966; 3,314,696 issued to G. R. Ferguson et al on Apr. 18, 1967; 3,450,424 issued to J. V. Calisher on June 17, 1969; 3,471,186 issued to W. K. Luebbert et al on Oct. 7, 1969; 3,490,795 issued to G. Hennlich on Jan. 20, 1970; 3,534,988 issued to J. W. Lindsey on Oct. 20, 1970; 3,538,940 issued to C. H. Graham on Nov. 10, 1970; 3,584,902 issued to G. N. Vyse on June 15, 1971; 3,637,240 issued to E. Meier on Jan. 25, 1972; 3,698,747 issued to Wing et al on Oct. 17, 1972; 3,753,582 issued to C. H. Graham on Aug. 21, 1973; 3,767,234 issued to Weirich et al on Oct. 23, 1973; 3,842,870 issued to W. R. Burgess on Oct. 22, 1974; 3,973,791 issued to Porta et al on Aug. 10, 1976; 4,234,262 issued to Nakai et al on Nov. 18, 1980; 4,260,184 issued to Greenawalt et al on Apr. 7, 1981; 4,423,891 issued to W. H. Menges on Jan. 3, 1984; 4,431,218 issued to Paul, Jr. et al on Feb. 14, 1984; 4,524,995 issued to D. D. Bartholomew on June 25, 1985; 4,537,427 issued to H. M. Cooke on Aug. 27, 1985; 4,570,980 issued to S. H. Goward on Feb. 18, 1986; 4,772,052 issued to E. W. Morain on Sept. 20, 1988.

In several of the above patents, the retaining clip is positioned onto the housing after the male conduit has been inserted. Thus, the retainer functions as a staple or the like to retain the conduits together.

While the above patents appear to perform satisfactorily for their intended purpose, designers are always striving to improve the field.

The present invention provides the art with a hair pin style retainer which has flexible legs enabling spreading of the retainer legs to provide for insertion and removal of the male conduits. The legs also retain the male conduits within the housing after insertion. The retainer remains on the housing at all times during insertion and removal of the male conduits. Also, the present invention provides the art with a female housing having a pair of slots defining ramped surfaces in the housing wall. The ramped surfaces enable the hair pin style retainer to move or slide along the ramped surfaces, within the slots, to enable insertion and removal of the male conduit.

From the following detailed description and preferred embodiment of the present invention, other objects and advantages of the present invention will become apparent to those skilled in the art.

BRIEF DESCRIPTION OF THE DRAWINGS

FIG. 1 is an exploded perspective view of a quick connector assembly in accordance with the present invention.

FIG. 2 is a front elevation view of the female housing of the assembly in accordance with the present invention.

FIG. 3 is a top elevation view of the female housing in accordance with the present invention.

FIG. 4 is a view like that of FIG. 3 with the hair pin retainer.

FIG. 4A is a view like that of FIG. 4 with the male fitting partially inserted.

FIG. 5 is a side elevation view partially in cross-section of the female portion of an assembly in accordance with the present invention.

FIG. 5A is a view like that of FIG. 5 with the male fitting inserted in the female housing.

FIG. 6 is a front elevation view of a pin in accordance with the present invention.

FIG. 6A is a side view of the pin of FIG. 6.

DETAILED DESCRIPTION OF THE PREFERRED EMBODIMENT

Turning to the figures, particularly FIG. 1, a quick connector assembly is illustrated and designated with the reference numeral 10. The assembly 10 includes a female housing 12 coupled with a conduit 14, a retaining member 16, and a second conduit 18 having a male fitting end 20 adapted to be connected within the female housing 12.

The housing 12 has an overall cylindrical shape wall 28. The female housing wall 28 includes a head portion 30, a body portion 32 and a tail 34. An axial bore 36 is coincident with the housing longitudinal axis 38 through the entire length of the housing 12. The housing wall 28 has an exterior diameter at the head portion 30 less than the exterior diameter at the body portion 32 but larger than the diameter of the tail portion 34 as seen in FIGS. 3–5A. The housing 12 is a unitary structure molded preferably from a desired plastic material.

A pair of opposing slots 42 and 44 are formed in the housing wall 28 between the head 30 and body 32. The slots 42 and 44 extend through the wall 28 and into the axial bore 36. The slots 42 and 44 define ramped surfaces 46, 48, 50 and 52 on the head 30 and the body 32, respectively. The ramped surfaces 46, 48, 50, and 52 are at an acute angle with respect to the longitudinal axis 38. The ramped surfaces 46 and 50, and 48 and 52 are substantially parallel to one another and are at acute angles with respect to the longitudinal axis 38. The angles are generally between 20° to 70° providing for movement of the legs along the surfaces. The ramped surfaces 50 and 52 enable the retainer 16 to move thereon as will be explained herein.

The body 32 generally includes O-rings 54 an 56 and gasket material 58 and 60 to seal the male fitting end 20 within the female housing 12 as seen in FIGS. 5 and 5A. The tail 34 enables the conduit 14 to be secured thereon. Also, clamps (not shown) may be positioned around the conduit 14 at the tail 34 to enhance the connection of the conduit 14 to the housing 12.

The retainer 16 is of a hair pin style. The retainer 16 is generally manufactured from a spring material including a head 70 and legs 72 and 74. The head 70 may be comprised of one or more loops having arcuate portions 76 and straight portions 78 which are substantially perpendicular to the legs 72 and 74 as shown in FIG. 6 and 6A. The legs extend from the head portion 70 and terminate with feet 80 and 82 The feet 80 and 82 are angled with respect to the legs 72 and 74.

The retaining member 16 is inserted into the slots 42 and 44 such that legs 72 and 74 are positioned transversely with respect to the longitudinal axis 38 and traverse the axial bore 36, as seen in FIG. 2. When the male fitting end 20 is inserted into the axial bore 36, the legs 72 and 74 begin to spread as seen in phantom in FIG. 2 and in FIGS. 4A and 5A. As the legs 72 and 74 spread, they rotate about the head 70 as seen in phantom in FIG. 2. As the bead 21 on the male member approaches the legs 72 and 74, the legs spread further apart. As the legs spread and rotate they also move upward along the ramped surfaces 50 and 52 as illustrated in FIGS. 4A and 5A. Generally, the legs 72 and 74 do not move at an equal pace and the legs are not in the same plane which would be perpendicular to the longitudinal axis as illustrated in FIG. 5A. The legs continue to move upward along the ramped surfaces 50 and 52 until the bead 21 passes between the legs 72 and 74. After the bead 21 passes through the legs 72 and 74, the legs 72 and 74 resiliently spring back to their original position behind the bead 21 to retain the male fitting end 20 within the female housing 12 as seen in phantom in FIG. 4.

The feet 80 and 82 may be moved manually to maneuver the legs 72 and 74 along the surfaces 50 and 52. As the feet 80 and 82 are moved, the legs slide along the surfaces 50 and 52 until the legs are spread enough to enable the male fitting end 20 to be removed from the female housing 12.

While the above detailed description fulfills the preferred embodiment of the present invention, it will be understood that the present invention is susceptible to modification, variation, and alteration without deviating from the scope and fair meaning of the subjoined claims.

What is claimed is:

1. A conduit assembly comprising:
   a housing including a peripheral wall having an exterior surface and defining an axial bore through said housing, said axial bore defining an axis;
   a pair of slots in said housing peripheral wall, said slots positioned on opposite sides of said housing peripheral wall opposing one another and formed in said housing peripheral wall at an acute angle with respect to the axis of the axial bore of the housing such that ramped surfaces are formed on the exterior surface of the housing peripheral wall at the slots; and
   a retaining member having an overall loop shaped head and a pair of legs extending from said head, said legs received in said slots, such that said head and legs are transversely positioned with respect to the axial bore and extending outside of said housing with a portion of said legs traversing said bore, said legs being flexible and adapted to move from an original position upwardly along said ramped surfaces to enable the insertion and removal of a beaded conduit and adapted to return to the original position to retain the beaded conduit within the housing.

2. The assembly according to claim 1 wherein said retainer head includes an open configuration of material forming said retaining member and said legs being continuous with said configuration such that said legs rotate about said head during movement of said legs.

3. The assembly according to claim 2 wherein said head having a portion, said portion being positioned substantially transverse to said legs and adapted to contact said housing wall when said legs are received in said slots.

4. The assembly according to claim 2 wherein said legs include feet angled with respect to said legs, said feet enabling manipulation of said legs to move said legs along said ramped surfaces to enable removal of the beaded conduit from said housing.

5. The assembly according to claim 1 wherein said retaining member manufactured from spring material.

6. The assembly according to claim wherein said legs pass through said slots such that the ends of the legs extend beyond the exterior periphery of said housing.

7. A conduit assembly comprising:
   a housing including a peripheral wall having an exterior surface and defining an axial bore through said housing, said axial bore defining an axis;
   a first conduit coupled with said housing and adapted to convey fluid therethrough;
   a second conduit having an annular bead positioned a desired distance from an end of said second conduit, said second conduit adapted to convey fluid therethrough;
   a pair of slots in said housing peripheral wall, said slots positioned on opposite sides of said housing peripheral wall opposing one another and formed in said housing peripheral wall at an acute angle with respect to the axis of the axial bore of the housing such that ramped surfaces are formed on the exterior surface of the housing peripheral wall at the slots; and
   a retaining member having an overall loop shaped head and a pair of legs extending from said head, said legs received in said slots, such that said head and legs are transversely positioned with respect to the axial bore and extending outside of said housing with a portion of said legs traversing said bore, said legs being flexible and adapted to move from an original position upwardly along said ramped surfaces to enable the insertion and removal of the bead of said second conduit and return to their original position to retain the bead of the second conduit within the housing.

* * * * *